Aug. 16, 1938.   L. WEISELBERG   2,127,440
LATERAL FENDER BEAM FOR AUTOMOBILES
Filed March 26, 1937
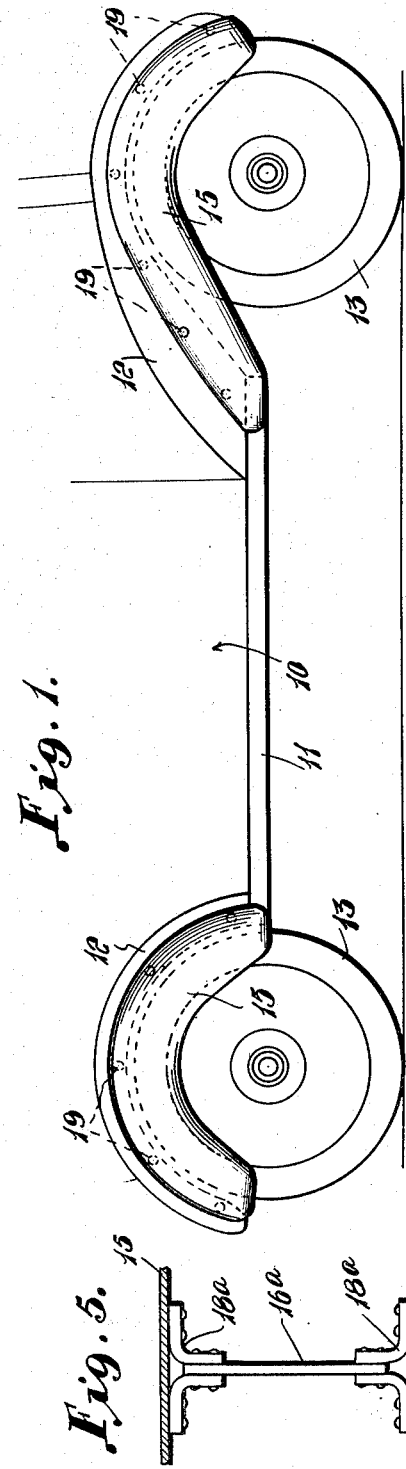
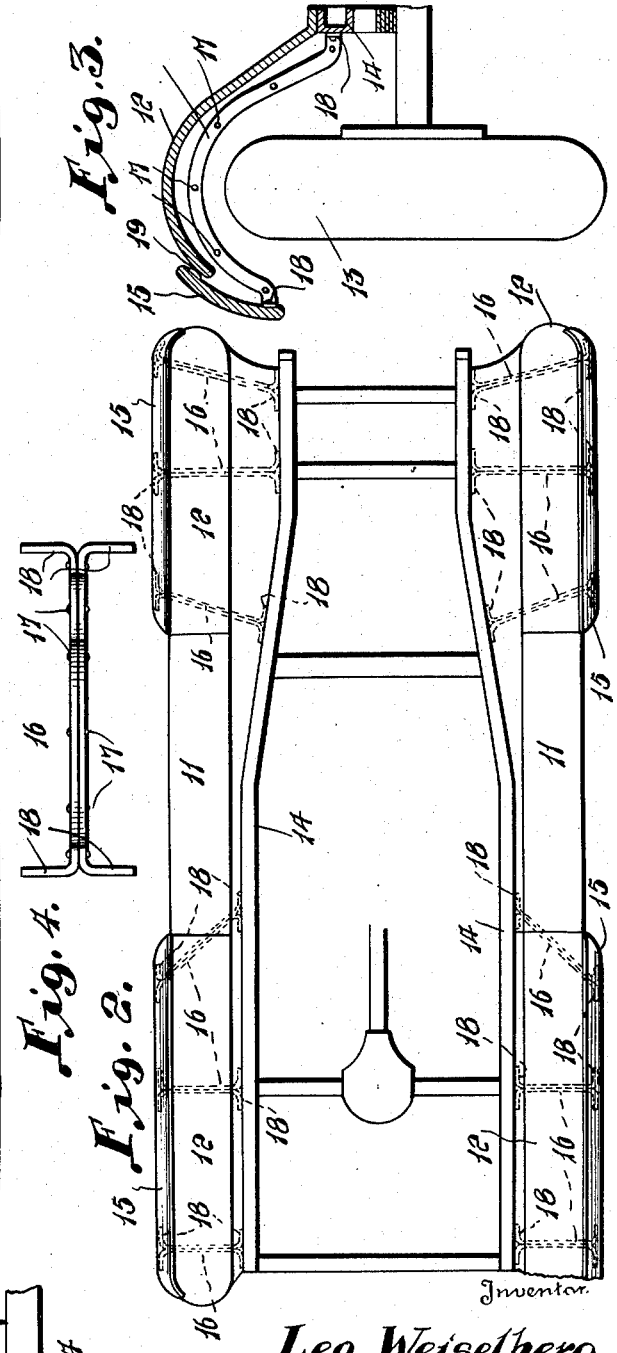
Inventor
Leo Weiselberg Patented Aug. 16, 1938

2,127,440

UNITED STATES PATENT OFFICE 2,127,440

LATERAL FENDER BEAM FOR AUTOMOBILES

Leo Weiselberg, New York, N. Y.

Application March 26, 1937, Serial No. 133,248

2 Claims. (Cl. 293—57)

This invention relates to lateral fender beams for automobiles.

The primary object of the invention is to provide a lateral fender beam for the fenders of automobiles wherein the beam is associated with the outer lower edge of the fender and is of such design as to present a symmetrical appearance relative to the fender to create the impression of a marginal bead or the like.

A further object of the invention is to provide a lateral fender beam for association with the lower outer edge of the fender of an automobile and in which the transverse breadth of the fender may be shortened with the fender beam constituting a replacement and of a width to complete any desired width or total area of fender, the beam being preferably formed of spring steel.

A still further object of the invention is to provide a lateral fender beam of the foregoing character that is supported in position by means of curved bracket arms overlying the automobile wheels and respectively connected at their ends to the automobile chassis and lateral fender beam adjacent the lower edge of the latter with the upper edge of the fender beam overlying the edge of the fender and carrying cushion buffers on its inner face adjacent the upper edge for wiping contact with the underlying part of the fender, whereby the fender beam may move relatively to the fender without marring the fender.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a fragmentary side elevational view of an automobile showing the lateral fender beam associated with the automobile fender;

Figure 2 is a top plan view of the automobile chassis illustrating three bracket arms for the support of each lateral fender beam;

Figure 3 is a detail cross-sectional view through one of the fenders, showing a lateral fender beam carried by a bracket supported on the chassis and overlying the lower outer edge of a laterally reduced fender with the fender beam forming a symmetrical continuation of the fender;

Figure 4 is a plan view of a bracket comprising two connected U-shaped strap members for attaching the lateral fender beam to the automobile chassis; and Figure 5 is a plan view of another form of bracket arm attached at its ends to the chassis and lateral fender beam, the latter being shown in section.

Referring more in detail to the accompanying drawing, the reference character 10 designates an automobile equipped with a running board 11, fenders 12, ground wheels 13 and a chassis including longitudinally extending side bars 14.

Automobile wheel fenders generally project outwardly of the wheels 13 of the automobile and downwardly for some distance, and constitute the extreme lateral dimensions of the automobile, and the outer sides of fenders are frequently subjected to damage which results in the destruction of the pleasing symmetrical appearance of the fenders. The present invention aims to overcome the foregoing objections and in the use thereof, fender 12 may be laterally shortened to save material with the shortened side of the fender replaced by a lateral fender beam that forms a symmetrical continuation of the fender to restore the same to any desired width or total area, the lateral fender beam being preferably formed of spring steel and of sufficient strength to absorb normal shock, comparable with the front and rear bumpers of the automobile.

The lateral fender beam 15 as shown in Figures 1 and 3 constitutes a replacement for the laterally shortened fender 12, the beam being longitudinally curved to follow the contour of the lower outer edge of the fender 12 and is of a width to complete any desired transverse dimensions of the fender, the beam 15 being transversely curved coincident to the adjacent transverse curvature of the fender 12 to present a symmetrical continuation of the fenders.

To support the lateral fender beams in proper positions relative to the fenders 12, bracket supports for the fender beams 15 are carried by the chassis bars and as shown in Figure 4, the bracket comprises a pair of arched strap members 16 connected together as by rivets 17 with an outwardly directed foot 18 at the outer end of each strap member 16. The feet 18 at one end of the bracket are secured to the chassis bar 14 while the feet at the other end of the bracket are secured to the lateral fender beam 15 at the inner sides thereof and adjacent the lower edge, preferably three brackets being provided for the support of each lateral fender beam as shown in Figure 2. The strap portions 16 of the brackets are sufficiently arched to extend over the ground wheel 13 as shown in Figure 3 and are also spaced from the overlying fender 12, the distance being such that normal vibratory movement of the fender 12 and lateral fender beam 15 may be had with the bracket arms remaining spaced from the fender at all times. Cushion buffers 19 are carried by the inner face of the lateral fender beams 15 adjacent their upper edges for contact with the underlying edge of the fender 12 to function as anti-rattlers and also to aid in spacing the lateral fender beams from the fender and to protect the finish of the latter.

Another form of bracket support for the lateral fender beam is illustrated in Figure 5, the upwardly arched resilient arm 16a having an outwardly directed angular foot 18a attached to each side thereof at opposite ends with a pair of angle feet 18a attached to the chassis bar 14 while the other pair of angle feet 18a are attached to the lateral fender beam 15.

From the above detailed description of the invention, it is believed that the construction and operation thereof will at once be apparent and while there are herein shown and described the preferred embodiments of the present invention, it is nevertheless to be understood that minor changes may be made therein without departing from the spirit and scope of the invention as claimed.

I claim:—

1. The combination with the fender of an automobile in which the outer edge of the fender terminates in proximity of the upper side of the automobile wheel, of a lateral spring steel beam longitudinally and transversely curved coincident to corresponding curvatures of the fender and of a width to extend downwardly below the upper side of the automobile wheel to present a symmetrical continuation of the fender and with its upper edge overlapping the upper side of the fender at the outer edge thereof, each fender beam terminating at one end at the adjacent end of the running board of the automobile and the other end terminating adjacent the end of the associated fender and substantially laterally thereof, upwardly arched resilient bracket arms overlying the wheels of the automobile, each bracket arm having one end secured to a chassis bar of the automobile and the other end secured to the inner side of the lateral fender beam adjacent its lower edge and completely hidden from view whereby the fender and bracket arm may vibrate relatively to each other and remain out of contact and cushion buffers carried by the inner faces of the lateral fender beam above the points of connection of the bracket arms therewith and adjacent the upper edge for spacing the lateral fender beam from the fender to prevent marring of the fender, the bracket arms, each including an upwardly arched strap iron, an outwardly directed angle foot secured to each end of the strap iron at opposite sides thereof with the pair of feet at each end of the bracket arm respectively secured to the chassis bar and lateral fender beam.

2. The combination with the fender of an automobile, wherein the fender is laterally shortened at its outer side edge relative to the present standard transverse dimensions thereof, of a lateral spring steel beam forming a replacement of the laterally shortened fender, and being longitudinally and transversely curved coincident to corresponding curvatures of the fender to present a symmetrical continuation of the fender and with its upper edge overlapping the upper side of the laterally shortened fender at the outer edge thereof, upwardly arched resilient bracket arms overlying the wheels of the automobile, each bracket arm having one end secured to a chassis bar of the automobile and the other end secured to the inner side of the lateral fender beam adjacent its lower edge and completely hidden from view whereby the fender and bracket arm may vibrate relatively to each other and remain out of contact and cushion buffers carried by the inner faces of the lateral fender beam above the points of connection of the bracket arms therewith and adjacent the upper edge for spacing the lateral fender beam from the fender to prevent marring of the fender, the bracket arms, each including an upwardly arched strap iron, an outwardly directed angle foot secured to each end of the strap iron at opposite sides thereof with the pair of feet at each end of the bracket arm respectively secured to the chassis bar and lateral fender beam.

LEO WEISELBERG.